United States Patent
Shi et al.

(10) Patent No.: US 7,820,258 B2
(45) Date of Patent: Oct. 26, 2010

(54) CONTAINER AND COMPOSITION FOR ENHANCED GAS BARRIER PROPERTIES

(75) Inventors: Yu Shi, Branchburg, NJ (US); Francis M. Schloss, Perrsyburg, OH (US); Doyle A. Weemes, Greeneville, TN (US); Mary K. Weemes, legal representative, Greeneville, TN (US)

(73) Assignee: The Coca-Cola Company, Atlanta, GA (US)

( * ) Notice: Subject to any disclaimer, the term of this patent is extended or adjusted under 35 U.S.C. 154(b) by 664 days.

(21) Appl. No.: 11/532,361

(22) Filed: Sep. 15, 2006

(65) Prior Publication Data

US 2007/0082156 A1 Apr. 12, 2007

Related U.S. Application Data

(60) Provisional application No. 60/723,751, filed on Oct. 5, 2005.

(51) Int. Cl.
*B32B 1/02* (2006.01)
(52) U.S. Cl. .................... 428/35.7; 428/542.8; 426/112
(58) Field of Classification Search ................ 428/35.7, 428/542.8; 426/656, 112; 524/91, 106; 546/255
See application file for complete search history.

(56) References Cited

U.S. PATENT DOCUMENTS

| | | | |
|---|---|---|---|
| 3,134,742 A * | 5/1964 | Wismer et al. .............. 521/108 |
| 4,401,805 A | 8/1983 | Weemes et al. | |
| 4,412,804 A | 11/1983 | Huther | |
| 4,474,918 A | 10/1984 | Seymour et al. | |
| 4,573,597 A * | 3/1986 | Adams et al. ................ 215/372 |
| 4,574,148 A | 3/1986 | Wicker et al. | |
| 4,837,115 A * | 6/1989 | Igarashi et al. ........... 428/36.92 |
| 4,861,256 A | 8/1989 | Covey | |
| 4,882,410 A | 11/1989 | Neugebauer et al. | |
| 5,011,720 A | 4/1991 | Jabarin | |
| 5,021,515 A | 6/1991 | Cochran et al. | |
| 5,028,462 A | 7/1991 | Matlack et al. | |
| 5,095,001 A | 3/1992 | Miles et al. | |
| 5,466,141 A | 11/1995 | Eckardt et al. | |
| 5,473,161 A | 12/1995 | Nix et al. | |
| 5,662,926 A | 9/1997 | Wick et al. | |
| 5,679,373 A | 10/1997 | Wick et al. | |
| 5,684,071 A * | 11/1997 | Mogami et al. ............. 524/100 |

(Continued)

FOREIGN PATENT DOCUMENTS

EP 0395237 10/1990

(Continued)

OTHER PUBLICATIONS

RS-230029 A, Published Jun. 1983.*

(Continued)

*Primary Examiner*—Rena L Dye
*Assistant Examiner*—Erik Kashnikow
(74) *Attorney, Agent, or Firm*—Sutherland Asbill & Brennan LLP (57) ABSTRACT

A container comprising a polyester composition with enhanced carbon dioxide and oxygen barrier properties is provided. The polyester composition comprises a polyester and a purine derivative. In a particular embodiment, the purine derivative comprises a purine dione, such as caffeine.

30 Claims, 2 Drawing Sheets

U.S. PATENT DOCUMENTS

| | | |
|---|---|---|
| 5,700,554 A | 12/1997 | Speer et al. |
| 5,744,056 A | 4/1998 | Venkateshwaran et al. |
| 5,837,186 A | 11/1998 | Gotterbauer |
| 5,888,598 A | 3/1999 | Brewster et al. |
| 5,898,060 A | 4/1999 | Suzuki et al. |
| 5,914,138 A | 6/1999 | Swenson |
| 5,952,066 A | 9/1999 | Schmidt et al. |
| 6,010,715 A | 1/2000 | Wick et al. |
| 6,150,450 A | 11/2000 | Sekiyama et al. |
| 6,150,454 A | 11/2000 | Wu et al. |
| 6,320,014 B1 | 11/2001 | Takahashi et al. |
| 6,465,109 B2 | 10/2002 | Ohtsuka |
| 6,596,213 B2 | 7/2003 | Swenson |
| 6,680,093 B1 | 1/2004 | Ries et al. |
| 6,720,052 B1 | 4/2004 | Rule et al. |
| 6,740,378 B1 | 5/2004 | Rule et al. |
| 6,749,785 B2 | 6/2004 | Subramanian et al. |
| 6,756,013 B1 | 6/2004 | Cornell et al. |
| 6,808,753 B2 | 10/2004 | Rule et al. |
| 6,811,826 B2 | 11/2004 | Rule et al. |
| 6,929,836 B2 | 8/2005 | Kikuchi et al. |
| 6,982,119 B2 | 1/2006 | Shi |
| 2002/0198331 A1 | 12/2002 | Nishihara et al. |
| 2003/0194517 A1 | 10/2003 | Shi |
| 2003/0194563 A1 | 10/2003 | Shi |
| 2004/0116619 A1 | 6/2004 | Moad et al. |
| 2004/0146567 A1 * | 7/2004 | Taniguchi et al. ........... 424/618 |
| 2004/0247739 A1 | 12/2004 | Sabin et al. |
| 2005/0082707 A1 | 4/2005 | Sabin et al. |
| 2005/0100696 A1 | 5/2005 | Shi |
| 2005/0118371 A1 | 6/2005 | Shi |
| 2005/0153084 A1 | 7/2005 | Shi |
| 2005/0196500 A1 | 9/2005 | Shi |
| 2005/0221036 A1 | 10/2005 | Shi |
| 2005/0260371 A1 | 11/2005 | Shi et al. |
| 2005/0279707 A1 | 12/2005 | Matthews et al. |
| 2005/0281969 A1 | 12/2005 | Shi et al. |
| 2006/0246242 A1 | 11/2006 | Siegel et al. |
| 2006/0257602 A1 | 11/2006 | Shi |
| 2006/0257603 A1 | 11/2006 | Shi et al. |
| 2006/0275568 A1 | 12/2006 | Shi et al. |
| 2007/0014953 A1 | 1/2007 | Siegel et al. |
| 2008/0113134 A1 | 5/2008 | Shi et al. |

FOREIGN PATENT DOCUMENTS

| | | |
|---|---|---|
| EP | 0678554 | 10/1995 |
| GB | 1434828 | 5/1976 |
| JP | 61195155 | 8/1986 |
| JP | 53339357 | 12/1993 |
| JP | 2000212302 | 2/2000 |
| WO | 94/26622 | 11/1994 |
| WO | WO 01/12521 | 2/2001 |
| WO | 02/13612 A2 | 2/2002 |
| WO | 2005/014254 | 2/2004 |
| WO | 2004/041496 | 5/2004 |
| WO | 2004/113414 | 12/2004 |

OTHER PUBLICATIONS

European Bioinformatics Website on 7H-purine. http://www.ebi.ac.uk/chebi/searchld.do?chebiId=CHEBI:17258 (2006-2009).*

"Nylon-MXD6 (PA-MXD6)," posted at the Mitsubishi Chemical Inc.'s Website.

Maeda, Y., et al., "Effect of Antiplasticization on Gas Sorption and Transport. I. Polysulfone," Journal of Polymer Science: Part B: Polymer Physics, vol. 25, 957-980 (1987).

Maeda, Y., et al., "Effect of Antiplasticization on Gas Sorption and Transport. II. Polysulfone," Journal of Polymer Science: Part B: Polymer Physics, vol. 25, 981-1003 (1987).

Maeda, Y., et al., "Effect of Antiplasticization on Gas Sorption and Transport. III. Polysulfone," Journal of Polymer Science: Part B: Polymer Physics, vol. 25, 1005-1016 (1987).

Maxwelli, et al., "Secondary relaxation processes in polyethylene terephthalate-additive blends: 2. Dynamic mechanical and dielectric investigations," Polymer, vol. 39, Num. 26, 6851-6859 (1998).

Robeson, L M., et al., "Secondary Loss Transitions in Antiplasticized Polymers," Polymer Science, Part B, vol. 7, 35-40 (1969).

Van Krevelen, D. W., "Properties of Polymers: Their Correlation with Chemical Structure; Their Numerical Estimation and Prediction from Additive Group Contributions," Elsevier Science B.V., Third Completely Revised Revision (1997).

L.M. Robeson & J.A. Faucher, J. Polymer Science, Part B 7, 35-40 (1969).

Office Action mailed on Oct. 28, 2009 for U.S. Appl. No. 11/850,575.

* cited by examiner

Fig. 1

CONTAINER AND COMPOSITION FOR ENHANCED GAS BARRIER PROPERTIES

RELATED APPLICATION DATA

The present application claims priority under 35 U.S.C. §119(e) to U.S. Provisional Application No. 60/723,751, entitled "Container and Composition for Enhanced Gas Barrier Properties," filed on Oct. 5, 2005, which is hereby incorporated by reference in its entirety.

FIELD OF THE INVENTION

This invention relates to a packaged beverage, and more particularly to enhancing the carbon dioxide and oxygen barrier properties of a container for a packaged beverage, thereby increasing the shelf life of its contents, by incorporating an additive into polyethylene terephthalate (PET) and its copolyesters.

BACKGROUND AND OF THE INVENTION

Polyethylene terephthalate and its copolyesters (hereinafter referred to collectively as "PET") are widely used to make containers for carbonated soft drinks, juice, water, and the like due to their excellent combination of clarity, mechanical, and gas barrier properties. In spite of these desirable characteristics, insufficient gas barrier of PET to oxygen and carbon dioxide limits application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2 percent per week loss rate at room temperature depending on the size of the container. A smaller container has a larger surface area to volume ratio resulting in a higher relative loss rate. For this reason, PET containers are currently used only as larger containers for packaging carbonated soft drinks, while metal cans and glass containers are the choice for smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules. For example, external or internal coatings for enhancing the gas barrier of PET containers have been developed. The coating layer is normally a very high barrier layer, either inorganic or organic, and slows down the diffusion of gases. Implementation of this technology, however, requires coating equipment not normally utilized in the manufacture of packaged beverages and therefore requires substantial capital investment, increased energy usage, and increased floor space. In many beverage packaging plants that are already crowded, the additional space is not an option.

Multi-layered containers have also been developed with a high barrier layer sandwiched between two or more PET layers. Implementation of this technology also requires substantial capital investment and delamination of the container layers impacts appearance, barrier, and mechanical performance of the containers.

A barrier additive for the PET or a polymer with inherent barrier properties would be preferred solutions. Neither such solution requires additional capital investment, and therefore, does not have the limitations inherent with other technologies. A barrier additive can also be added during the injection molding process which gives more flexibility for downstream operations.

L. M. Robeson and J. A. Faucher disclose in J. Polymer Science, Part B 7, 35-40 (1969) that certain additives can be incorporated into polymers to increase their modulus and gas barrier properties through an antiplasticization mechanism. This article discloses utilizing additives with polycarbonate, polyvinyl chloride, polyphenylene oxide, and polythyelene oxide.

In WO 01/12521, Plotzker et al. propose the use of additives selected from 4-hydroxybenzoates and related molecules to increase the gas barrier properties of PET. This published patent application discloses barrier additives of the following structure:

HO-AR-COOR, HO-AR-COOR COO-AR-OH, HO-AR-CONHR, HO-AR-CO—NHR3-COO-AR-OH, HO-AR-CONHR2NHCO-AR-OH

In the foregoing structure, AR is selected from the group consisting of substituted or unsubstituted phenylene or naphthalene. And R1, R2, and R3 are selected from the group consisting from C1 to C6 alkyl groups, a phenyl group, and a naphthyl group.

The foregoing additives described in the art provide only moderate improvement in PET barrier, less than 2.1 times (X) for oxygen barrier for the best examples with a 5 weight percent loading level. At this loading level, however, PET experiences substantial degradation and a significant drop in intrinsic viscosity (IV). Although lowering the level of additive reduces the degradation of PET, it also reduces the barrier improvement factor, so much so that no real benefit exists in using these additives in packaging carbonated soft drinks or oxygen sensitive food. Part of the IV loss is due to the addition of the small molecular additive. Additional IV loss results when additives contain functional groups capable of reacting with PET and causing the break down of the molecular weight. Additives with reactive functional groups usually are more soluble in PET and thus do not impart haziness in the bottle. PET with a significantly lower IV cannot be used in blow molding containers, such as beverage containers. Furthermore, lower IV PET makes containers with poor mechanical performance, such as creep, drop impact, and the like, Still further, PET containers made from lower IV PET have poor stress cracking resistance, which is undesirable in container applications.

PET has been modified or blended with other components to enhance the gas barrier of the PET. Examples include polyethylene naphthalate (PEN)/PET copolymers or blends, isophthalate (IPA) modified PET, PET blended with polyethylene isophthalate (PEI) or a polyamide, such as nylon, and PET modified with resorcinol based diols. For a PET copolymer to achieve moderate barrier enhancement of 2× or higher, the modification is normally more than 10 to 20 weight or mole percent of the total co-monomers. When PET is modified to such a high level, the stretching characteristics of the PET are changed dramatically such that the normal PET container preform design could not be used in the manufacture of containers. Using these PET copolymers to mold conventional PET container preforms results in preforms that can not be fully stretched and the ultimate containers are very difficult, if not impossible, to make. Even if such a container can be made, it does not show improved barrier performance and shows deteriorated physical performance such that it can not be used to package carbonated soft drinks. U.S. Pat. Nos. 5,888,598 and 6,150,450 disclose redesigned PET container preforms with thicker side walls to compensate for the increased stretch ratio. This thicker preform, however, requires new molds which require additional capital investment. The thicker preform is also made at a lower rate of productivity because it takes longer to cool and heat the thicker wall preform. Furthermore, PET blends with polyamide such as nylon developed yellowness and haze and are not clear like conventional PET.

Thus, there is a need in the art to enhance the barrier performance of PET for use in applications that will require enhanced barrier, such as in the packaging of carbonated beverages and oxygen sensitive beverages and foods, in a manner that does not cause substantial degradation of the PET, does not substantially impact the stretch ratio of the PET, and does not negatively impact the clarity of the PET.

SUMMARY OF THE INVENTION

This invention addresses the above-described needs by providing a polyester container with enhanced gas barrier properties comprising a polyester composition comprised of polyester and a purine derivative.

In accordance with a particular embodiment, the polyester in the polyester composition comprises a poly(ethylene terephthalate) based copolymer (PET copolymer). In a particular embodiment, the polyester comprises a PET copolymer having less than 20 percent diacid component modification and/or less than 10 percent diol component modification, based on 100 mole percent diacid component and 100 mole percent diol component.

The polyester composition desirably comprises a purine derivative having the chemical structure of Formula I wherein $R_1$, $R_3$, $R_5$, and $R_7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group; wherein t, $t_1$, x, $x_1$, $x_2$, y, and z, independent of one another, are a single bond or a double bond; wherein t', x', y', and z', independent of one another, are 0 or 1; wherein x", y", and w', independent of one another, are 1 or 2;

wherein when x is a double bond, $x_1$ is a single bond; wherein when $x_1$ is a double bond, x and $x_2$ are single bonds; wherein when $x_2$ is a double bond, $x_1$ and $t_1$ are single bonds; wherein when t is a double bond, $t_1$ and z are single bonds; wherein when z is a double bond, t is a single bond; wherein when $t_1$ is a double bond, t and $x_2$ are single bonds; wherein when x is a double bond, x' is 0; wherein when x or $x_1$ is a double bond, x" is 1; wherein when y is a double bond, y' is 0 and y" is 1; wherein when t or $t_1$ is a double bond, t' is 0; wherein when z and t are single bonds, w' is 2; wherein when z or t is a double bond, w' is 1; wherein when z is a double bond, z' is 0; wherein when x, y, or z, independent of one another, is a single bond, and x', y', or z', independent of one another, is 1;

wherein $R_2$, $R_4$, and $R_6$, independent of one another, may be moieties attached by a single or double bond;

wherein when $R_2$, $R_4$, or $R_6$ is a moiety attached by a single bond, $R_2$, $R_4$ and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R_2$, $R_1$, or $R_6$ is a moiety attached by a double bond, $R_2$, $R_4$, or $R_6$, independent of one another, comprise oxygen, sulfur, $CR_8R_9$, $SO_2$, or $NR_{10}$; $R_8$ and $R_9$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R_{10}$ comprises a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group; and wherein when x" is 2, both $R_2$ moieties may be the same or different; wherein when y" is 2, both $R_4$ moieties may be the same or different; and wherein when w' is 2, both $R_6$ moieties may be the same or different.

In another embodiment of the compound of Formula I, the purine derivative comprises a compound having the chemical structure of Formula II wherein $t_1$, x, $x_1$, y, and z are single bonds; wherein $x_2$ and t are double bonds; wherein w', x', y', z', x", and y" are 1; wherein t' is 0; wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula III wherein x, $x_1$, y, and t, and $t_1$ are single bonds; wherein $x_2$ and z are double bonds; wherein t', w', x', y', x", and y" are 1; wherein z' is 0; wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_6$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula IV wherein x, $x_1$, y, t, $t_1$, and z are single bonds; wherein $x_2$ is a double bond; wherein t', w', x', y', z', x", and y" are 1; wherein $R_2$, $R_4$, and $R_6$, independent of one another, are moieties attached by a double bond comprising oxygen, sulfur, $CR_8R_9$, $SO_2$, or $NR_{10}$; and wherein $R_1$, $R_3$, $R_5$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula V wherein x, $x_1$, $t_1$, and z are single bonds; wherein and $x_2$, t, and y are double bonds; wherein w', x', z', x", and y" are 1; wherein y' and t' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment, the purine derivative comprises a compound having the chemical structure of Formula VI wherein x, $x_2$, y and z are double bonds; wherein $x_1$, t, and $t_1$ are single bonds; wherein t', w', x", and y" are 1; wherein x', y', and z' are 0; and wherein $R_2$, $R_4$, $R_6$, and $R_7$ comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula VII wherein x, $x_2$, and t are double bonds; wherein $t_1$, $x_1$, y and z are single bonds; wherein w', y', z', x", and y" are 1; wherein t' and x' are 0; wherein $R_2$ is a moiety attached by a double bond comprising oxygen, sulfur, $CR_8R_9$, $SO_2$, or $NR_{10}$; and wherein $R_3$, $R_4$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula VIII wherein $x_2$, y and t are double bonds; wherein x, $x_1$, $t_1$, and z are single bonds; wherein w', x', z', x", and y" are 1; wherein t' and y' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

In another embodiment of the compound of Formula I, the purine derivative comprises a compound having the chemical structure of Formula IX wherein $x_1$, y, $t_1$, and z are double bonds; wherein x, $x_2$, and t are single bonds; wherein w', x', x", and y" are 1; wherein t', y', and z' are 0; and wherein $R_1$, $R_2$, $R_4$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

According to another embodiment, this invention encompasses a method for enhancing gas barrier properties of a polyester container comprising blending a polyester with a purine derivative to form a polyester composition. According to particular embodiments, the polyester composition can be formed into articles such as a container.

Furthermore, in another embodiment of the invention, the step of forming the container comprises stretch blow molding. Particular embodiments of this invention provide polyester containers, such as PET containers, with enhanced gas barrier, and in particular, enhanced gas barrier to carbon dioxide and oxygen. This makes certain embodiments of the invention particularly suited for packaging carbonated soft drinks and oxygen sensitive beverages and foods. Particular embodiments achieve this enhanced gas barrier while maintaining acceptable physical properties and clarity.

Other objects, features, and advantages of the invention will be apparent from the following detailed description and claims.

DETAILED DESCRIPTION OF THE INVENTION

This invention encompasses a polyester container with enhanced gas barrier properties and a method for making a polyester container with enhanced gas barrier properties. Polyester containers and methods for making such containers made in accordance with embodiments of this invention are further described below and in accompanying FIGS. 1-4.

I. Polyester Composition

This invention is applicable to any polyester and is suitable for uses in which a high gas barrier is desirable. Suitable polyesters for use in embodiments of this invention include PET copolymers, polyethylene naphthalate (PEN), polyethylene isophthalate, and the like. PET copolymers are particularly useful because they are used for many barrier applications such as films and containers. Suitable containers include, but are not limited to, bottles, drums, carafes, coolers, and the like.

PET copolymers suitable for use in embodiments of this invention comprise a diol component having repeat units from ethylene glycol and a diacid component having repeat units from terephthalic acid. In particular embodiments, the PET copolymer has less than 20 percent diacid modification, 10 percent glycol modification, or both, based on 100 mole percent diacid component and 100 mole percent diol component. Such PET copolymers are well known.

Polyesters, including PET copolymers, have free volume between the polymer chains. As is known to those skilled in the art, the amount of free volume in polyesters such as PET copolymers determines their barrier to gas molecules. The lower the free volume, the lower the gas diffusion, and the higher the barrier to gas molecules. Desirably, the gas barrier enhancing additive is at least partially disposed in the free volume of the polyester between the polyester chains.

In a particular embodiment, a polyester composition comprises a polyester and an enhanced gas barrier additive comprising a purine derivative, which is further described below. The purine derivative of the polyester composition enhances the gas barrier properties of the polyester composition at low loading levels, desirably in the range of about 0.2 to about 10 weight percent of the polyester composition, more desirably in the range of about 3 to about 10 weight percent of the polyester composition, and still more desirably in the range of about 3 to about 5 weight percent of the polyester composition. At low loading levels, a slight barrier improvement factor (BIF) occurs, Although the improvement in the BIF is substantial at high loading levels, the physical properties of the PET deteriorate and make forming a container more difficult. The BIF is a measure of enhanced gas barrier properties (the ratio of the gas transmission rate of a polyester composition without an additive to the gas transmission rate of a polyester composition with an additive).

According to another embodiment, the polyester composition comprises:

a) a polyester present in the polyester composition in an amount in the range of about 90 to about 99.8 weight percent of the polyester composition; and b) a purine derivative present in the polyester composition in an amount in the range of about 0.2 to about 10 weight percent of the polyester composition.

In a particular embodiment, the polyester comprises a poly(ethylene terephthalate) based copolymer having less than 20 percent diacid modification, 10 percent glycol modification, or both, based on 100 mole percent diacid component and 100 mole percent diol component.

In another particular embodiment, the purine derivative is present in the polyester composition in an amount in the range of about 3 to about 10 weight percent of the polyester composition. In another particular embodiment, the purine derivative is present in the polyester composition in an amount in the range of about 3 to about 5 weight percent of the polyester composition.

II. Purine Derivatives

In a particular embodiment, a purine derivative has the chemical structure of Formula I wherein $R_1$, $R_3$, $R_5$, and $R_7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein t, $t_1$, x, $x_1$, $x_2$, y, and z, independent of one another, are a single bond or a double bond; wherein t', x', y', and z', independent of one another, are 0 or 1; wherein x", y", and w', independent of one another, are 1 or 2;

wherein when x is a double bond, $x_1$ is a single bond; wherein when $x_1$ is a double bond, x and $x_2$ are single bonds; wherein when $x_2$ is a double bond, $x_1$ and $t_1$ are single bonds; wherein when t is a double bond, $t_1$ and z are single bonds; wherein when z is a double bond, t is a single bond; wherein when $t_1$ is a double bond, t and $x_2$ are single bonds; wherein when x is a double bond, x' is 0; wherein when x or $x_1$ is a double bond, x" is 1; wherein when y is a double bond, y' is 0 and y" is 1; wherein when t or $t_1$ is a double bond, t' is 0; wherein when z and t are single bonds, w' is 2; wherein when z or t is a double bond, w' is 1; wherein when z is a double bond, z' is 0; wherein when x, y, or z, independent of one another, is a single bond, and x', y', or z', independent of one another, is 1;

wherein $R_2$, $R_4$, and $R_6$, independent of one another, may be moieties attached by a single or double bond;

wherein when $R_2$, $R_4$, or $R_6$ is a moiety attached by a single bond, $R_2$, $R_4$ and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R_2$, $R_4$, or $R_6$ is a moiety attached by a double bond, $R_2$, $R_4$, or $R_6$, independent of one another, comprise oxygen, sulfur, $CR_8R_9$, $SO_2$, or $NR_{10}$; $R_8$ and $R_9$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R_{10}$ comprises a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group.

wherein when x" is 2, both $R_2$ moieties may be the same or different; wherein when y" is 2, both $R_4$ moieties may be the same or different; and wherein when w' is 2, both $R_6$ moieties may be the same or different.

The moieties described above may further be substituted as known by one skilled in the art with a hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, and any other viable functional group.

In one embodiment of the compound of Formula I, the purine derivative comprises 7H-purine, having the chemical structure wherein x, $x_2$, y, and t are double bonds; wherein $x_1$, $t_1$ and z are single bonds; wherein x', y', and t' are 0; wherein x", y", z', and w' are 1; and wherein $R_2$, $R_4$, $R_5$, and $R_6$ are hydrogen.

In another embodiment of the compound of Formula I, the purine derivative comprises a compound having the chemical structure of Formula II wherein $t_1$, x, $x_1$, y, and z are single bonds; wherein $x_2$ and t are double bonds; wherein w', x', y', z', x", and y" are 1; wherein t' is 0; wherein $R_2$ and $R_4$, independent of one another, are moieties attached by a double bond comprising a oxygen, sulfur, $CR_8R_9$, $SO_2$, or $NR_{10}$; and wherein $R_1$, $R_3$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula II, the purine derivative comprises theobromine, a purine dione having the chemical structure wherein $R_1$ and $R_6$ are hydrogen; wherein $R_2$ and $R_4$ are oxygen; and wherein $R_3$ and $R_5$ are methyl, In another embodiment of the compound of Formula II, the purine derivative comprises caffeine, a purine dione having the chemical structure wherein $R_6$ is hydrogen; $R_2$ and $R_4$ are oxygen; and $R_1$, $R_3$ and $R_5$ are methyl.

In still another embodiment of the compound of Formula II, the purine derivative comprise theophylline, a purine dione having the chemical structure wherein $R_5$ and $R_6$ are hydrogen; wherein $R_2$ and $R_4$ are oxygen; and wherein $R_1$ and $R_3$ and are methyl.

In still yet another embodiment of the compound of Formula II, the purine derivative comprises xanthine, a purine dione having the chemical structure wherein $R_1$, $R_3$, $R_5$ and $R_6$ are hydrogen: and $R_2$ and $R_4$ are oxygen.

In another embodiment of the compound of Formula I, the purine derivative comprises a compound having the chemical structure of Formula III wherein x, $x_1$, y, and t, and $t_1$ are single bonds; wherein $x_2$ and z are double bonds; wherein t', w', x', y', x", and y" are 1; wherein z' is 0; wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_6$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In another embodiment of the compound of Formula I, the purine derivative comprises a compound having the chemical structure of Formula IV wherein x, $x_1$, y, t, $t_1$, and z are single bonds; wherein $x_2$ is a double bond; wherein t', w', x', y', z', x", and y" are 1; wherein $R_2$, $R_4$, and $R_6$, independent of one another, are moieties attached by a double bond comprising oxygen, sulfur, $CR_8R_9$, $SO_2$, or $NR_{10}$; and wherein $R_1$, $R_3$, $R_5$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula IV, the purine derivative comprises uric acid, a purine dione having the chemical structure wherein $R_1$, $R_3$, $R_5$ and $R_7$ are hydrogen; and wherein $R_2$, $R_4$, and $R_6$ are oxygen.

In another embodiment of the compound of Formula I, the purine derivative comprises a compound having the chemical structure of Formula V wherein x, $x_1$, $t_1$, and z are single bonds; wherein and $x_2$, t, and y are double bonds; wherein w', x', z', x", and y" are 1; wherein y' and t' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula V, the purine derivative comprises guanine, having the chemical structure wherein $R_1$, $R_5$, and $R_6$ are hydrogen; wherein $R_2$ is amino; and wherein $R_4$ is oxygen.

In another embodiment, the purine derivative comprises a compound having the chemical structure of Formula VI wherein x, $x_2$, y and z are double bonds; wherein $x_1$, t, and $t_1$ are single bonds; wherein t', w', x", and y" are 1; wherein x', y', and z' are 0; and wherein $R_2$, $R_4$, $R_6$, and $R_7$ comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula VI, the purine derivative comprises adenine, having the chemical structure wherein $R_2$, $R_6$, and $R_7$ are hydrogen; and wherein $R_4$ is an amino.

In another embodiment of the compound of Formula I, the purine derivative comprises a compound having the chemical structure of Formula VII wherein x, $x_2$, and t are double bonds; wherein $t_1$, $x_1$, y and z are single bonds; wherein w', y', z', x", and y" are 1; wherein t' and x' are 0; wherein $R_2$ is a moiety attached by a double bond comprising oxygen, sulfur, $CR_8R_9$, $SO_2$, or $NR_{10}$; and wherein $R_3$, $R_4$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula VII, the purine derivative comprises guanine, having the chemical structure wherein $R_3$, $R_5$, and $R_6$ are hydrogen; wherein $R_2$ is oxygen; and wherein $R_4$ is amino.

In another embodiment of the compound of Formula I, the purine derivative comprises a compound having the chemical structure of Formula VIII wherein $x_2$, y and t are double bonds; wherein x, $x_1$, $t_1$, and z are single bonds; wherein w', x', z', x", and y" are 1; wherein t' and y' are 0; wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula VIII, the purine derivative comprises 7-methylguanine, having the chemical structure wherein $R_1$ and $R_6$ are hydrogen; wherein $R_2$ is amino; wherein $R_4$ is oxygen, and wherein $R_5$ is methyl.

In another particular embodiment of the compound of Formula VIII, the purine derivative comprises thioguanine, having the chemical structure wherein $R_1$, $R_5$, and $R_6$ are hydrogen; wherein $R_2$ is amino; and wherein $R_4$ is sulfur.

In yet another embodiment of the compound of Formula VIII, the purine derivative comprises 6-mercaptopurine, having the chemical structure wherein $R_1$, $R_2$, $R_5$, and $R_6$ are hydrogen; and wherein $R_4$ is sulfur.

In still another embodiment of the compound of Formula VIII, the purine derivative comprises hypoxanthine, having the chemical structure wherein $R_1$, $R_2$, $R_5$, and $R_6$ are hydrogen; and wherein $R_4$ is oxygen.

In another embodiment of the compound of Formula I, the purine derivative comprises a compound having the chemical structure of Formula IX wherein $x_1$, y, $t_1$, and z are double bonds; wherein x, $x_2$, and t are single bonds; wherein w', x', x", and y" are 1; wherein t', y', and z' are 0; and wherein $R_1$, $R_2$, $R_4$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group, wherein the moieties may be further substituted as described above.

In a particular embodiment of the compound of Formula IX, the purine derivative comprises 1H-purine, having the chemical structure wherein $R_1$, $R_2$, $R_4$, and $R_6$ are hydrogen.

In another particular embodiment of the compound of Formula IX, the purine derivative comprises diaminopurine, having the chemical structure wherein $R_1$ and $R_6$ are hydrogen; and wherein $R_2$ and $R_4$ are amino.

The term "alkyl", as used herein, unless otherwise specified, refers to a saturated straight, branched, or cyclic, primary, secondary, or tertiary hydrocarbon of C1 to C20, and specifically includes methyl, ethyl, propyl, isopropyl, butyl, isobutyl, t-butyl, pentyl, isopentyl, neopentyl, hexyl, and isohexyl. The term includes both substituted and unsubstituted alkyl groups. Moieties with which the alkyl group can be substituted are selected from the group consisting of hydrogen, halogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, and any other viable functional group.

The term "alkenyl", as referred to herein, and unless otherwise specified, refers to a straight, branched, or cyclic hydrocarbon of C2 to C10 with at least one double bond. The alkenyl groups optionally can be substituted in the same manner as described above for the alkyl group and also optionally can be substituted with a substituted or unsubstituted alkyl group.

The term "alkynyl", as used herein, and unless otherwise specified, refers to a C2 to C10 straight or branched hydrocarbon with at least one triple bond. The alkynyl groups optionally can be substituted in the same manner as described above for the alkyl groups and also optionally can be substituted with a substituted or unsubstituted alkyl group.

The term "aryl", as used herein, and unless otherwise specified, refers to any functional group or substituent derived from an aromatic ring. Non-limiting examples include phenyl, biphenyl, or napthyl. The term includes both substituted and unsubstituted moieties. The aryl group optionally can be substituted with one or more moieties as described above for the alkyl groups or a substituted or unsubstituted alkyl group.

The term "heteroaryl" or "heteroaromatic", as used herein, refers to an aromatic or unsaturated cyclic moiety that includes at least one sulfur, oxygen, nitrogen, or phosphorus in the aromatic ring. Non-limiting examples are furyl, pyridyl, pyrimidyl, thienyl, isothiazolyl, imidazolyl, tetrazolyl, pyrazinyl, benofuranyl, benothiophenyl, quinolyl, isoquinolyl, benzothienyl, ixobenzoiryl, pyrazolyl, indolyl, isoindolyl, benimidazolyl, purinyl, carbazolyl, oxazolyl, thiazolyl, isothiazolyl, 1,2,4-thiadiazolyl, isoxazolyl, pyrolyl, quinazolinyl, pyridazinyl, pyrazinyl, cinnolyl, phthalazinyl, quinoxalinyl, xanthinyl, hypoxanthinyl, and pteridnyl. The heteroaryl or heteroaromatic group optionally can be substituted with one or moieties as described above for the alkyl group or a substituted or unsubstituted alkyl group.

The term "heterocyclic" refers to a saturated nonaromatic cyclic group which optionally may be substituted, and wherein there is at least one heteroatom or non-carbon atom, such as oxygen, sulfur, nitrogen, or phosphorus in the ring. The heterocyclic group optionally can be substituted in the same manner as described above for the heteroaryl group.

The term "aralkyl", as used herein, and unless otherwise specified, refers to an aryl group as defined above linked to the molecule through an alkyl group as defined above. The term alkaryl, as used herein, and unless otherwise specified, refers to an alkyl group as defined above linked to the molecule through an aryl group as defined above. The aralkyl or alkaryl group optionally can be substituted with one or more moieties selected from the group consisting of hydroxyl, carboxy, carboxamido, carboalkoxy, acyl, amino, halo, alkylamino, alkoxy, aryloxy, nitro, cyano, sulfo, sulfato, phospho, phosphato, and phosphonato.

The term "halo", as used herein, specifically includes chloro, bromo, iodo, and fluoro.

The term "alkoxy", as used herein, and unless otherwise specified, refers to a moiety of the structure —O-alkyl, wherein alkyl is as defined above.

The term "acyl", as used herein, refers to a group of the formula C(O)R', wherein R' is an alkyl, aryl, heteroaryl, heterocyclic, alkaryl or aralkyl group, or substituted alkyl, aryl, heteroaryl, heterocyclic, aralkyl or alkaryl, wherein these groups are as defined above.

II. Methods of Making Polyester Composition and Containers

As described above, the polyester composition of this invention is useful for making containers in which enhanced gas barrier is desirable. In short, such containers are made by forming the above described polyester compositions into the desired container by conventional methods such as melt forming. Suitable melt forming processes include, but are not limited to, injection molding, extrusion, thermal forming and compression molding. The particularly preferred method for making the containers of this invention is stretch blow molding.

Methods for incorporating the purine derivative additive into the container and polyester composition are also provided herein. Such methods also well known to those skilled in the art. For example, an additive can be fed directly into the polyester during the injection molding process, preblended with the polyester resin prior to injection molding, or incorporated at high concentrations with PET as masterbatch and then blended with the polyester resin prior to injection molding of the container.

Figure 1:
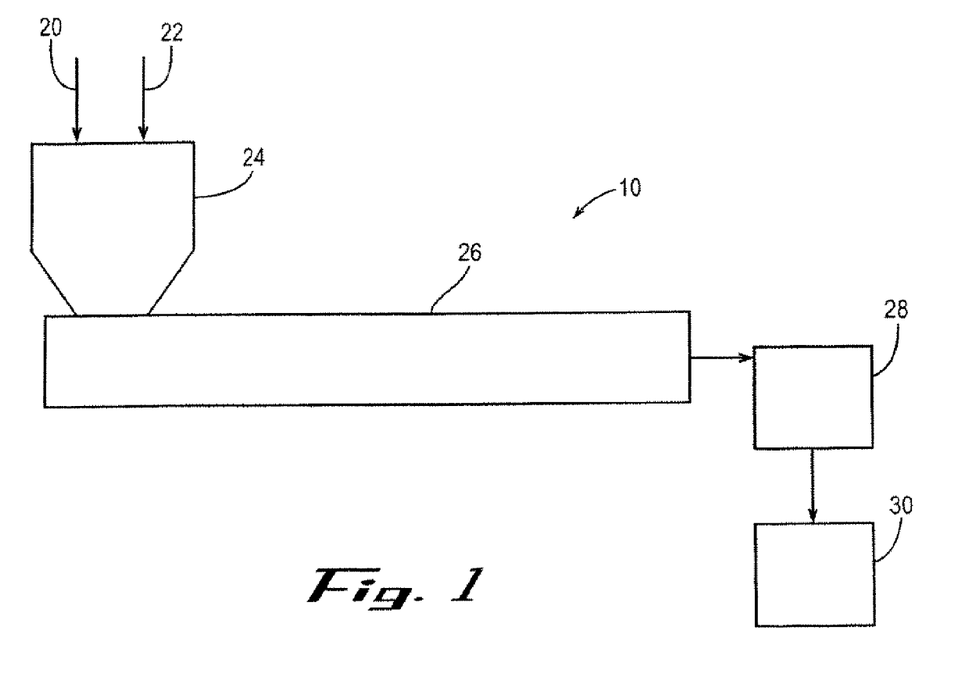
FIG. 1 is a schematic diagram of a system for making a PET container with enhanced gas barrier in accordance with an embodiment of this invention.

FIG. 1 illustrates a system 10 in accordance with an embodiment of this invention for making a rigid container preform 12 (illustrated in FIG. 2) and a rigid container 14 (illustrated in FIG. 3) from the preform. As is shown in FIG. 1, PET 20 and a gas barrier enhancing additive 22, such as a purine derivative, are added to a feeder or hopper 24 that delivers the components to a hot melt extruder 26 in which the components are melted and blended. The hot melt extruder 26 then extrudes the molten mixture of PET 20 and gas barrier enhancing additive 22 into an injection molding device 28 to form the preform 12. The preform 12 is cooled and removed from the injection molding device 28 and delivered to a stretch blow molding device 30 which stretch blow molds the preform 12 into a finished rigid container 14.

Figure 2:
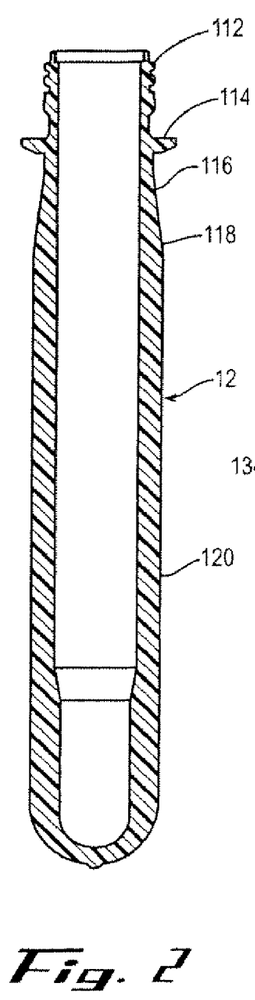
FIG. 2 is a sectional elevation view of a molded container preform made in accordance with an embodiment of this invention.

The melt residence time of the preform production is preferably less than five minutes and more preferably from about one to about three minutes. The melt temperatures are desirably from about 270 to about 300° C. and more desirably from about 270 to about 290° C. The melt residence time begins when the PET 20 and gas barrier enhancing additive 22 enter the melt extruder 26 and start melting, and ends after injection of the molten blend into the injection mold to form the preform 12.

In a particular embodiment, the injection molding process can be modified by pressurizing the mold cavity to minimize plate-out, as described in the co-pending U.S. patent application entitled "Pressurized Tooling for Injection Molding and Method of Using," which is hereby incorporated by reference in its entirety, and was filed on Sep. 15, 2006, by Schultheis, et al. Pressurizing the mold cavity changes the dynamics of the processing cycle by reducing or completely eliminating the ability of additives to diffuse through the PET copolymer and deposit on the inner surface of the mold. The desired pressure of the mold cavity can be optimized for a particular polymer material, polymer matrix, or additive.

The modified injection molding process (not pictured) includes the additional step of pressurizing a mold by introducing a pressurized gas into a mold cavity in the mold, wherein the mold cavity defines the shape of the container preform; introducing a polyester composition into the mold cavity; cooling the polyester composition to form the container preform; and removing the container preform from the mold cavity.

The pressurized gas may be any gas that does not detrimentally affect the polyester composition. Non-limiting examples include air and its individual components, oxygen, nitrogen, and carbon dioxide; the noble gases, argon, neon, helium, and xenon; and mixtures thereof. In a particular embodiment, the mold cavity is pressurized to a pressure in the range of about 1 to about 1000 psig.

III. Containers

As is well known to those skilled in the art, containers can be made by blow molding a container preform. Examples of suitable preform and container structures are disclosed in U.S. Pat. No. 5,888,598, the disclosure of which is expressly incorporated herein by reference in its entirety.

A polyester container preform 12 is illustrated in FIG. 2. This preform 12 is made by injection molding PET based resin and comprises a threaded neck finish 112 which terminates at its tower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

Figure 3:
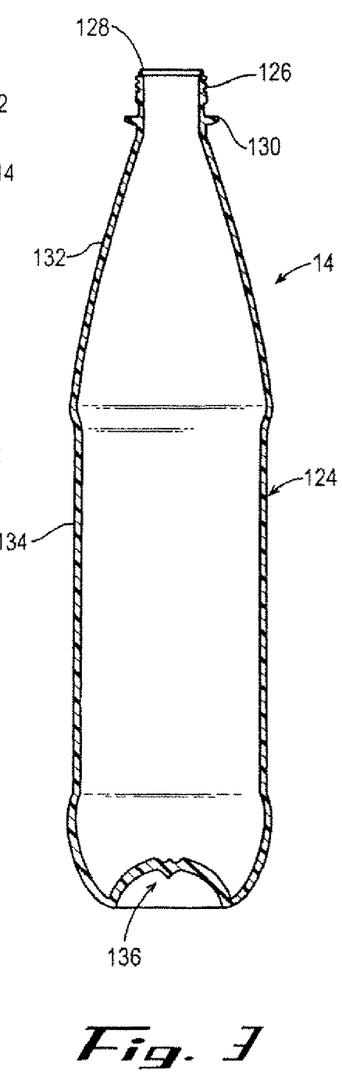
FIG. 3 is a sectional elevation view of a blow molded container made from the preform of FIG. 2 in accordance with an embodiment of this invention.
Figure 4:
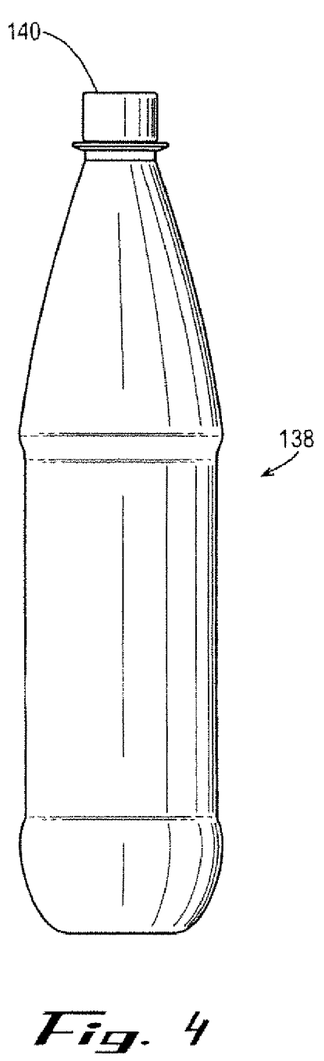
FIG. 4 is a perspective view of a packaged beverage made in accordance with an embodiment of this invention.

The preform 12 illustrated in FIG. 2 can be stretch blow molded to form a container 14 illustrated in FIGS. 3 and 4. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 4. The packaged beverage 138 includes a beverage such as a carbonated soda beverage disposed in the container 14 and a closure 140 sealing the mouth 128 of the container.

The polyester container optionally may comprise a plurality of layers as described in co-pending patent application Ser. No. 11/850,575 filed on Sep. 15, 2006, entitled "Multilayer Container having Small Molecule Barrier Additives," the disclosure of which is expressly incorporated herein by reference in its entirety. A multilayer container can permit the use of additives in a barrier layer that normally would be too volatile for inclusion in a single layer container because the low molecular weight additive is contained within two outer layers without the low molecular weight additive, preventing contact between the low molecular weight additive and the surfaces of the injection molding apparatus.

Briefly described, a multilayer container comprises at least two outer layers comprising a polymer matrix and at least one barrier layer disposed between the at least two outer layers. The at least one barrier layer comprises a polyester composition comprising a polyester and an enhanced gas barrier additive comprising a purine derivative. Desirably, the low molecular weight additive is present in the multilayer container in an amount in the range of about 0.2 to about 10 weight percent of the container, the at least two outer layers comprise about 99 to about 20 weight percent of the container, and the one or more barrier layers comprise about 1 to about 80 weight percent of the container. In another particular embodiment, the multilayer container further comprises at least one intermediate layer between the at least one barrier layer and the at least two outer layers.

The preform 12, container 14, and packaged beverage 138 are but examples of applications using the preforms of the present invention. It should be understood that the process and apparatus of the present invention can be used to make preforms and containers having a variety of configurations.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLES

Example 1

A commercially available polyester container grade resin (Kosa, Spartanburg, S.C.) was dried in a vacuum oven at 140° C. overnight to a moisture level below 50 ppm. The additives were dried in a vacuum oven at 70° C. overnight to remove surface moisture. Containers were made with the PET, both alone and in combination with varying amounts of additives. A lab scale Arburg unit cavity injection molding machine was used for injection molding. The preforms were blow molded with a Sidel SBO 2/3 blow molding machine to make acceptable contour containers. A 24.5 g preform made a 500 mL container.

The oxygen transmission rates of the containers were then measured using a Mocon 2/60 model instrument at 22.2° C. and 50% relative humidity (RH) with the $N_2/H_2$ (99:1) and air purging rates of 10 mL/min on opposite sides. The results are shown in Table 1. The barrier improvement factor (BIF) was defined as the ratio of the oxygen transmission rate of the polyester container with additive to the oxygen transmission rate of the polyester container without additive.

TABLE 1

Oxygen transmission rate of 500 mL PET containers

| Additive | Weight Percent | IV (dL/g) | $O_2$ transmission rate (cc/pkg/day) | Oxygen BIF | Bottle Appearance |
|---|---|---|---|---|---|
| N/A | 0 | 0.80 | 0.046 | 1.00 | Clear |
| Caffeine | 3 | 0.79 | 0.0306 | 1.5 | Clear |
| Caffeine | 5 | 0.77 | 0.0261 | 1.76 | Clear |

The oxygen BIF of the 500 mL containers improved significantly with the addition of caffeine to the PET composition, without impairing the IV or clarity of the containers Example 2

A commercially available polyester container grade resin (Voridian, Kinosport, Tenn.) was prepared, injection molded, and blow molded as described in Example 1. A 26.5 g preform made a 20 oz container.

The bottles were filled with dry ice to achieve an internal pressure of 56 psi. The loss rate of $CO_2$ from the bottles was measured at 22° C. and 50% RH using a method described by U.S. Pat. No. 5,473,161, which is hereby incorporated by reference in its entirety. The results are shown in Table 2. The barrier improvement factor (BIF) was defined as the ratio of the $CO_2$ loss rate of the polyester container without additive was divided by the $CO_2$ loss rate of the polyester container with additive. The shelf life of the simulated carbonated soft drink for each container also was calculated as described by U.S. Pat. No. 5,473,161.

TABLE 2

$CO_2$ Loss of 20 oz PET containers

| Additive | Weight Percent | $CO_2$ shelf life (Weeks) | $CO_2$ BIF |
|---|---|---|---|
| N/A | 0 | 8.7 | 1.00 |
| Caffeine | 0.2 | 9.2 | 1.1 |
| Caffeine | 7.7 | 14.6 | 1.7 |
| Caffeine | 10 | 17.77 | 2.0 |

The carbon dioxide BIF of the 20 oz polyester containers improved significantly with the addition of caffeine to the PET composition, significantly increasing the carbon dioxide shelf life of the polyester containers.

Example 3

A commercially available polyester container grade resin (Kosa, Spartanburg, S.C.) was prepared, injection molded, and blow molded as described in Example 1. A 21 g preform made a 12 oz container. The loss rate of $CO_2$ from the bottles and $CO_2$ shelf life were determined as described in Example 2. The results are shown in Table 3.

TABLE 3

$CO_2$ Loss 12 oz PET containers

| Additive | Weight percent | IV (dL/g) | $CO_2$ shelf life (Weeks) | $CO_2$ BIF |
|---|---|---|---|---|
| N/A | 0 | 0.77 | 8.9 | 1.0 |
| Caffeine | 1 | 0.77 | 10.4 | 1.2 |
| Caffeine | 3 | 0.75 | 12.2 | 1.4 |
| Caffeine | 5 | 0.77 | 13.8 | 1.6 |

The carbon dioxide BIF of the 12 oz containers improved significantly with the addition of caffeine to the PET composition, significantly increasing the carbon dioxide shelf life of the containers without impairing the IV of the containers.

Example 4

A commercially available polyester container grade resin (Kosa, Spartanburg, S.C.) was combined with caffeine (12 weight percent), pelletized, and dried at 140° C. The mixture and dried PET, prepared as described in Example 1, were combined to achieve a caffeine loading level of 3 weight percent prior to injection molding, as described in Example 1, at a mold temperature setting of 38° C. to make acceptable 21 g preforms. The preforms were collected at different times during the injection molding runs and cut in half so that the colors of the preforms could be measured with a Hunter lab calorimeter. The results are shown in Table 5. Time 0 represents the PET preform without caffeine. Hunter $L^*, a^*, b^*$ color space is a 3-dimensional rectangular color space based on the opponent-colors theory and expanded in the yellow region, wherein on the $L^*$ (lightness) axis white is 100 and black is 0, wherein on the $a^*$ (red-green) axis red is positive, green is negative, and neutral is 0; and wherein on the $b^*$ (blue-yellow) axis yellow is positive, blue is negative, and neutral is 0. $DE^*$ is a measure of the total color difference, calculated by taking the square root of the sum of the squares of the changes in $L^*, a^*, b^*$.

TABLE 5

PET Preform Color as a Function of Run Time (hrs)

| Time (hrs) | $L^*$ | $a^*$ | $B^*$ | Haze | $DE^*$ |
|---|---|---|---|---|---|
| 0 | 79.38 | −0.32 | 2.16 | 15.84 | 19.99 |
| 0.5 | 78.66 | −0.66 | 3.38 | 11.71 | 20.43 |
| 1.5 | 78.76 | −0.64 | 3.57 | 11.26 | 20.36 |
| 2.5 | 78.70 | −0.68 | 3.47 | 11.27 | 20.40 |
| 3.5 | 78.55 | −0.61 | 3.5 | 11.65 | 20.56 |
| 4.5 | 78.68 | −0.60 | 3.32 | 11.69 | 20.40 |
| 5.5 | 78.70 | −0.61 | 3.40 | 11.97 | 20.39 |
| 6.5 | 78.70 | −0.59 | 3.33 | 11.96 | 20.39 |
| 7.5 | 78.89 | −0.63 | 3.64 | 12.30 | 20.24 |
| 8.5 | 78.95 | −0.61 | 3.26 | 12.01 | 20.12 |
| 9.5 | 78.96 | −0.62 | 3.42 | 11.98 | 20.14 |
| 10.5 | 78.81 | −0.62 | 3.31 | 12.47 | 20.27 |

There is no significant difference between the colors of the preforms at different run times, indicating that the addition of caffeine to the PET composition does not significantly impair the preform qualities at different times.

It should be apparent that the foregoing relates only to the preferred embodiments of the present invention and that numerous changes and modification may be made herein without departing from the spirit and scope of the invention as defined by the following claims and equivalents thereof.

What is claimed is:

1. A stretch blow molded container having enhanced gas barrier properties for packaging of foods and beverages prepared from an injection molded preform comprises a polyester composition comprising a polyester and a purine derivative, wherein the purine derivative comprises a compound having the chemical structure of Formula I wherein $R_1$, $R_3$, $R_5$, and $R_7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein $t$, $t_1$, $x$, $x_1$, $x_2$, $y$, and $z$, independent of one another, are a single bond or a double bond; wherein $t'$, $x'$, $y'$, and $z'$, independent of one another, are 0 or 1 wherein $x''$, $y''$, and $w'$, independent of one another, are 1 or 2;

wherein when $x$ is a double bond, $x_1$ is a single bond; wherein when $x_1$ is a double bond, $x$ and $x_2$ are single bonds; wherein when $x_2$ is a double bond, $x_1$ and $t_1$ are single bonds; wherein when $t$ is a double bond, $t_1$ and $z$ are single bonds; wherein when $z$ is a double bond, $t$ is a single bond; wherein when $t_1$ is a double bond, $t$ and $x_2$ are single bonds; wherein when $x$ is a double bond, $x'$ is 0; wherein when $x$ or $x_1$ is a double bond, $x''$ is 1; wherein when $y$ is a double bond, $y'$ is 0 and $y''$ is 1; wherein when $t$ or $t_1$ is a double bond, $t'$ is 0; wherein when $z$ and $t$ are single bonds, w' is 2; wherein when z or t is a double bond, w' is 1; wherein when z is a double bond, z' is 0; wherein when x, y, or z, independent of one another, is a single bond, and x', y', or z', independent of one another, is 1;

wherein $R_2$, $R_4$, and $R_6$, independent of one another, may be moieties attached by a single or double bond;

wherein when $R_2$, $R_4$, or $R_6$ is a moiety attached by a single bond, $R_2$, $R_4$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R_2$, $R_4$, or $R_6$ is a moiety attached by a double bond, $R_2$, $R_4$, or $R_6$, independent of one another, comprise oxygen, sulfur, $CR_8R_9$, $SO_2$, $NR_{10}$; $R_8$ and $R_9$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R_{10}$ comprises a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein when x" is 2, both $R_2$ moieties may be the same or different; wherein when y" is 2, both $R_4$ moieties may be the same or different; and wherein when w' is 2, both $R_6$ moieties may be the same or different.

2. The container of claim 1, wherein the purine derivative of Formula I comprises a compound having the chemical structure of Formula II wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

3. The container of claim 2, wherein the purine derivative of Formula II comprises theobromine, a purine dione having the chemical structure

4. The container of claim 2, wherein the purine derivative of Formula II comprises caffeine, a purine dione having the chemical structure

5. The container of claim 2, wherein the purine derivative of Formula II comprises theophylline, a purine dione having the chemical structure 6. The container of claim 2, wherein the purine derivative of Formula II comprises xanthine, a purine dione having the chemical structure

7. The container of claim 1, wherein the purine derivative of Formula I comprises a compound having the chemical structure of Formula III wherein $R_2$ and $R_4$, independent of one another, are moieties attached by a double bond comprising oxygen, sulfur, $CR_8R_9$, $SO_2$, or $NR_{10}$; and wherein $R_1$, $R_3$, $R_6$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

8. The container of claim 1, wherein the purine derivative of Formula I comprises a compound having the chemical structure of Formula IV wherein $R_2$, $R_4$, and $R_6$, independent of one another, are moieties attached by a double bond comprising oxygen, sulfur, $CR_8R_9$, $SO_2$, or $NR_{10}$; and wherein $R_1$, $R_3$, $R_5$, and $R_7$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

9. The container of claim 8, wherein the purine derivative of Formula IV comprises uric acid, a purine dione having the chemical structure 10. The container of claim 1, wherein the purine derivative of Formula I comprises a compound having the chemical structure of Formula V wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

11. The container of claim 10, wherein the purine derivative of formula V comprises guanine, having the chemical structure 12. The container of claim 1, wherein the purine derivative of Formula I comprises a compound having the chemical structure of Formula VI wherein $R_2$, $R_4$, $R_6$, and $R_7$ comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

13. The container of claim 12, wherein the purine derivative of Formula VI comprises adenine, having the chemical structure

14. The container of claim 1, wherein the purine derivative of Formula I comprises a compound having the chemical structure of Formula VII wherein $R_2$ is a moiety attached by a double bond comprising oxygen, sulfur, $CR_8R_9$, $SO_2$, or $NR_{10}$; and wherein $R_3$, $R_4$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

15. The container of claim 14, wherein the purine derivative of Formula VII comprises guanine, having the chemical structure 16. The container of claim 1, wherein the purine derivative of Formula I comprises a compound having the chemical structure of Formula VIII wherein $R_4$ is a moiety attached by a double bond comprising oxygen, sulfur, $CR_8R_9$, $SO_2$, or $NR_{10}$; and wherein $R_1$, $R_2$, $R_5$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

17. The container of claim 16, wherein the purine derivative of Formula VIII comprises 7-methylguanine, having the chemical structure

18. The container of claim 16, wherein the purine derivative of Formula VIII comprises thioguanine, having the chemical structure

19. The container of claim 16, wherein the purine derivative of Formula VIII comprises 6-mercaptopurine, having the chemical structure 20. The container of claim 16, wherein the purine derivative of Formula VIII comprises hypoxanthine, having the chemical structure 21. The container of claim 1, wherein the purine derivative of Formula comprises a compound having the chemical structure of Formula IX wherein $R_1$, $R_2$, $R_4$, and $R_6$, independent of one another, comprise a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group.

22. The container of claim 21, wherein the purine derivative of Formula IX comprises 1H-purine, having the chemical structure 23. The container of claim 21, wherein the purine derivative of Formula IX comprises diaminopurine, having the chemical structure 24. The container of claim 1, wherein the purine derivative of Formula I comprises 7H-purine, having the chemical structure 25. The container of claim 1, wherein the purine derivative is present in the polyester composition in an amount in the range of about 0.2 to about 10 weight percent of the polyester composition.

26. The container of claim 1, wherein the purine derivative is present in the polyester composition in an amount in the range of about 3 to about 10 weight percent of the polyester composition.

27. The container of claim 1, wherein the purine derivative is present in the polyester composition in an amount in the range of about 3 to about 5 weight percent of the polyester composition.

28. The container of claim 1, wherein the polyester comprises polyethylene terephthalate.

29. The container of claim 1, wherein the polyester composition comprises a poly(ethylene terephthalate) based copolymer having less than 20 percent diacid, 10 percent glycol modification, or both, based on 100 mole percent diacid component and 100 mole percent diol component.

30. A packaged beverage comprising a beverage disposed in the container of claim 1 and a seal for sealing the beverage in the package.

* * * * *